United States Patent
Orcutt

[11] Patent Number: 5,918,640
[45] Date of Patent: Jul. 6, 1999

[54] TWIN TUBE AIR BRAKE HOSE

[75] Inventor: Eric D. Orcutt, Rockvale, Tenn.

[73] Assignee: Dana Corporation, Toledo, Ohio

[21] Appl. No.: 08/774,693

[22] Filed: Dec. 26, 1996

[51] Int. Cl.$^6$ .................................................. F16L 11/00
[52] U.S. Cl. ........................ 138/109; 138/110; 138/115; 138/116; 138/126; 138/137
[58] Field of Search ..................... 138/109, 115, 138/110, 116, 124, 126, 137, 103

[56] References Cited

U.S. PATENT DOCUMENTS

| | | | |
|---|---|---|---|
| 338,815 | 3/1886 | Yule | 138/115 |
| 2,122,335 | 6/1938 | Berman et al. | 138/126 |
| 2,136,230 | 11/1938 | Berman et al. | 138/137 |
| 2,139,888 | 12/1938 | Fausek et al. . | |
| 2,621,075 | 12/1952 | Sedar | 138/103 |
| 3,487,858 | 1/1970 | Hanback | 138/118 |
| 3,794,079 | 2/1974 | Fishel | 138/103 |
| 3,872,881 | 3/1975 | Miller et al. . | |
| 3,907,002 | 9/1975 | Gülich . | |
| 4,624,472 | 11/1986 | Stuart et al. . | |
| 4,634,151 | 1/1987 | Holt | 285/38 |
| 4,865,081 | 9/1989 | Newmann et al. | 138/109 |
| 5,346,290 | 9/1994 | Orcutt | 138/118 |

*Primary Examiner*—Denise L. Ferensic
*Assistant Examiner*—James F. Hook
*Attorney, Agent, or Firm*—Miller, White, Zelano, & Branigan, P.C.

[57] ABSTRACT

A twin tube air brake hose for delivering compressed air to brakes on a vehicle such as a truck includes a first tube which serves as a service tube and a second tube which serves as an emergency tube. The first tube and second tube have an inner layer surrounded by a reinforcing layer which is in turn surrounded by an outer rubber layer. The outer rubber layers of each tube are joined by a web which is unitary with the outer layers. Adjacent opposite ends of the twin tube brake hose, the tubes are separated to form free end portions, each of which have a metal fitting. Reinforcing bands are fitted around the twin tube air brake hose just inboard the tail ends to prevent the web from splitting.

5 Claims, 2 Drawing Sheets

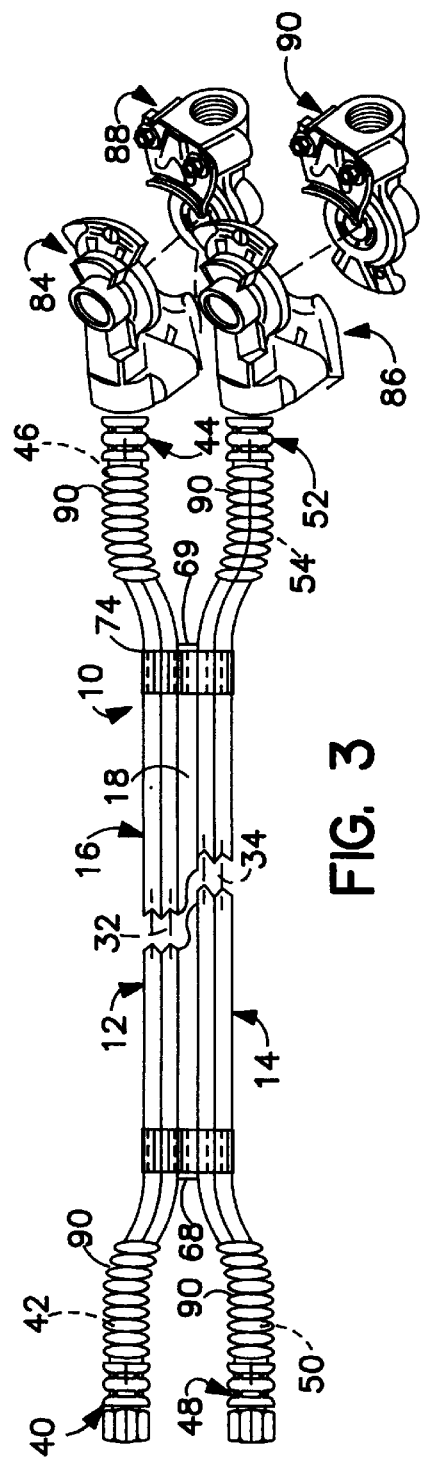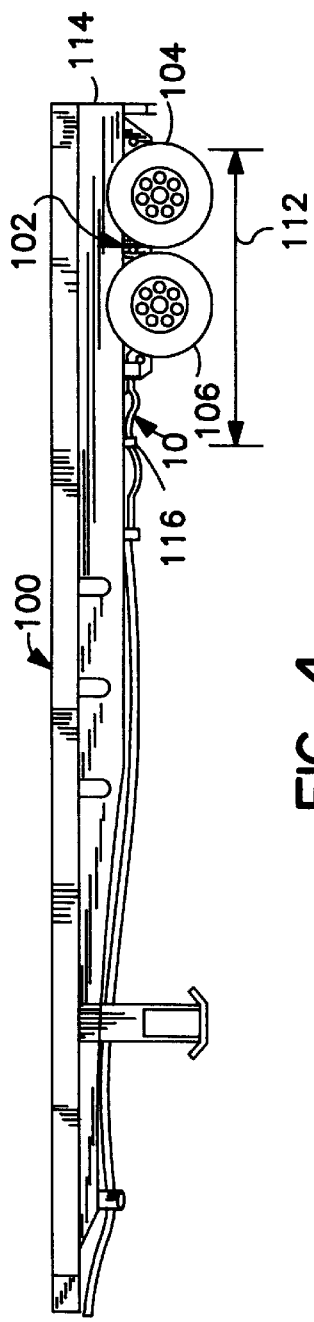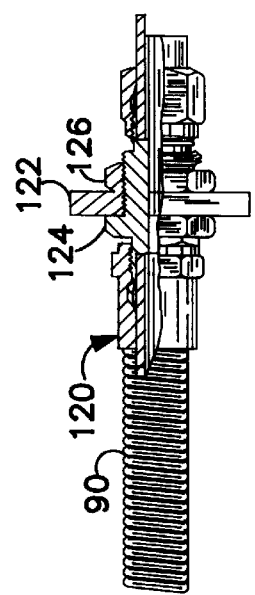

TWIN TUBE AIR BRAKE HOSE

FIELD OF THE INVENTION

The invention relates to hoses for air brakes. More particularly, the invention relates to hoses for air brakes used on tractor trailers for connections between air brake actuators in tractors and air brakes on trailers, and between air supply sources on trailers and air brakes of adjustable rear axles of the trailers.

BACKGROUND ART

Tractor-to-trailer air brake lines and trailer slider lines are always used in pairs with two separate lines extending substantially parallel to one another. The first line is for service braking, i.e., braking which is normally relied on, and the second line is an emergency air brake line. It is the current practice to have two separate brake lines which are held in proximity to one another with clips, tethers or brackets.

Truck trailers with long beds present an additional problem because these trailers are frequently equipped with rear axles that are slidably adjustable to move in forward and rearward directions with respect to the beds. It is necessary to have axles which are adjustable in this manner because truck trailers carry loads of various sizes which may have horizontal centers of gravity which are closer to one end of a trailer bed than the other. During the past 15 years, regulations have changed, allowing truck trailers of increased length. Such truck trailers almost necessarily must have rear axles which are slidable fore and aft.

In order to properly stop tractor trailers, it is necessary to brake the wheels of the slidable rear axle or axles, as well as the tractor wheels. Generally, activation of the wheels of slidable rear axles is accomplished by pairs of hoses which are configured as coil tubes, the coils of which expand and contract as the rear axles are moved fore and aft on the trailer bed.

Since coiled tubes require considerably more tube length to connect between locations than uncoiled tubes, the expense of coiled tubes is considerably higher than the expense of uncoiled tubes. It is, however, difficult to keep pairs of air brake tubes proximate one another if the tubes are not nested, as in the case of coiled tubes, or if the tubes are not held together by tethers, clamps or brackets, which are also expensive as well as being otherwise troublesome.

SUMMARY OF THE INVENTION

In view of the aforementioned considerations, it is a feature of the present invention to provide air brake tubing for use with tractor trailer connections and for use with air brakes on trailers having at least one adjustable axle, wherein the expense of such tubing is minimized and wherein convenience is enhanced.

In view of the aforementioned features, as well as other features, the instant invention is directed to an air brake hose having first and second tubes, the first and second tubes having first and second end portions and having outer rubber layers which are unitary with one another along a seam joining the first and second tubes. The outer rubber layers join the first and second tubes along a seam which extends longitudinally between the locations where the first and second end portions of each tube start.

In a more specific aspect, the first and second end portions of the first and second tubes each have spring nuts which are adapted to connect via couplings to laterally spaced input and output fittings on air supply and air brake lines.

BRIEF DESCRIPTION OF THE DRAWING

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a side view showing the twin tube air brake hose of FIG. 1 used with a glad-hand assembly;

FIG. 4 is a side view of a trailer bed utilizing the twin tube air brake hose used with a connection between fixed lines of a trailer with a movable axle;

FIG. 5 is a side elevation showing one tube of the twin tube air brake secured to a bulkhead of a trailer.

DETAILED DESCRIPTION

Figure 1:
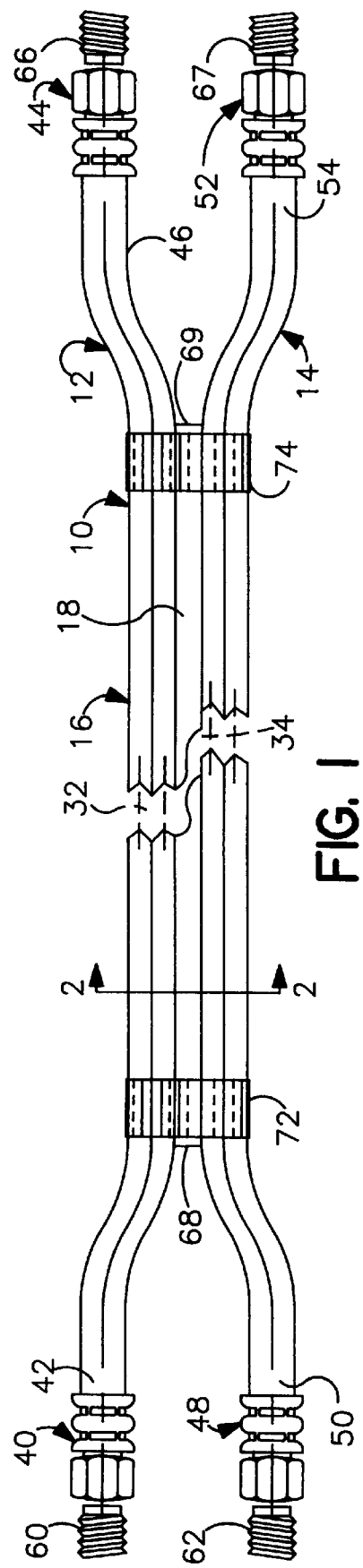
FIG. 1 is a top view of a twin tube air brake hose configured in accordance with the principles of the present invention.

Referring now to FIG. 1, there is shown a top view of a twin tube air brake hose configured in accordance with the principles of the present invention. The twin tube air brake hose 10 is comprised of a first tube 12 which is a service tube and a second tube 14 which is an emergency tube. The first tube 12 is used for normal braking, while the second tube 14 is employed if the first tube fails to deliver air to a trailer's air brakes. In accordance with the principles of the present invention, the first tube 12 and the second tube 14 are joined along a substantial length portion 16 by a web 18.

Figure 2:
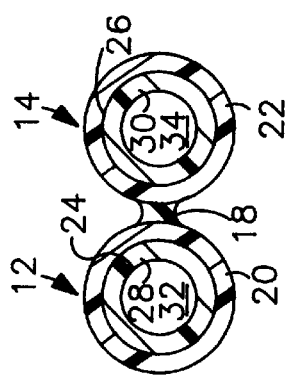
FIG. 2 is an elevation taken along line 2—2 of FIG. 1.

As is perhaps best shown in FIG. 2, the web 18 is unitary with outer rubber layers 22 and 20 of the first and second tubes 12 and 14. The outer rubber layers 20 and 22 surround at least one layer spiral textile reinforcement 24 and 26, respectively, which in turn surround inner rubber layers 28 and 30, so as to define and support circular openings 32 and 34 which deliver the service and emergency compressed air to the associated brakes.

The first line 12 has a coupling 40 at a first end 42 thereof and a coupling 44 at a second end 46 thereof, while the second line 14 has a coupling 48 at a first end 50 thereof and a coupling 52 at a second end 54 thereof. The couplings 40 and 48 couple with a first pair of spaced couplings 60 and 62, while the couplings 44 and 52 mate with a second pair of spaced couplings 66 and 67. Since the first couplings 60 and 62 are spaced from one another, it is necessary to slit the web 18 so that the first end portions 42 and 50 of the first and second tubes 12 and 14 may be laterally spaced from one another starting at split 68 and so that the second end portions 46 and 54 of the first and second tubes 12 and 14 may be laterally spaced from one another starting at split 69.

In order to ensure that the web 18 does not split further and that it holds the tubes 12 and 14 together over the substantial length portion 16 of the twin tube air brake hose 10, first and second retaining bands 72 and 74 are disposed around the twin tube air brake hose at locations just inboard of the splits 68 and 69 between the first and second tubes. Retaining members 72 and 74 may be made of brass or plastic and are dimensioned and configured to withstand the environmental pressures of being exposed to weather, wind and rough handling.

Referring now to FIG. 3, the twin tube air brake hose 10 is shown configured for connecting an air supply from a tractor to a brake system on a trailer, with the twin tube air brake hose 10 having its second ends 12 and 14 connected to glad hand connectors 84 and 86 which couple with glad hand connectors 88 and 90. In the second embodiment, as with most embodiments, the separated end portions 42 and 50 and 46 and 54 are preferably surrounded by coil springs 90.

While glad hand connectors 84 and 86 are only shown on one end of the twin tube air brake hose 10, it is to be understood that glad hand connectors may be on both ends of the twin tube air hose.

Referring now to FIG. 4, there is shown another use for the twin tube air brake hose 10 wherein the twin tube air brake hose is used with a trailer 100 having a sliding rear axle arrangement 102 in which wheel pairs 104 and 106 have axles 108 and 110 which may be shifted to various positions in the direction of arrow 112 toward and away from the rear end 114 of the trailer 100. The axles 108 and 110 are connected to brakes for the wheel pairs 104 and 106 and are also shifted. This requires that the service and emergency brake lines expand in a longitudinal direction with respect to the trailer 100. The prior art accommodates this expansion by utilizing nested coil hoses such as those disclosed in U.S. Pat. No. 5,346,290, assigned to the assignee of the present invention and incorporated herein by reference. In accordance with the present invention, the nested coils of the '290 patent are replaced by a length of twin tube air brake hose 10 which is considerably less expensive than the nested coils. For the slider line application, the length of the twin tube air brake hose 10 varies from 6 ft. to approximately 10 ft., any sag being accommodated by a support 116 extending beneath the twin tube air brake hose.

As is seen in FIG. 5, the end fittings 120 are of the style similar to the end fittings of the '290 patent wherein the end fittings are supported in bulk heads 122 by hex nuts 124 and 126. With this arrangement, one of the coil springs 90 is disposed around each of the end portions 42 and 50 and 46 and 54 of the twin tubes 12 and 14 respectively, which comprise the twin tube air brake hose 10.

Twin tube air brake hose 10 is used for longer length anti-lock lines which are becoming standard in heavy truck applications. In the previously discussed applications, separated end portions 42 and 50 and 46 and 54 have the same length but, with anti-lock twin line air brake hoses, the end portions may have different lengths in order to accommodate situations in which relatively long separated end portions follow paths of different lengths through the truck structure. With the anti-lock application, it is necessary to utilize the retaining bands 72 and 74 with spring guards 90 being optional.

From the foregoing description, one skilled in the art can easily ascertainthe essential characteristics of this invention, and without departing from the spirit and scope thereof, can make various changes and modifications of the invention to adapt it to various usages and conditions.

What is claimed is:

1. A twin air brake hose arrangement used to connect between laterally spaced outlet fittings on service and emergency compressed air supply lines and laterally spaced glad hand fittings on service and emergency air brake lines connected to air brakes on a trailer, the air brake hose comprising:

a first tube having first and second end portions, the first tube being connected to the service air supply line at the first end portion with a spring nut and to the service air brake line at the second end portion with a spring nut which is threaded into a first glad hand connector;

a second tube having first and second end portions, the second tube being connected to the emergency air supply at the first end portion with a spring nut and to the emergency air brake line at the second end with a spring nut which is threaded into a second glad hand connector;

the first and second tubes each having an outer rubber layer disposed over a layer of reinforcement with the outer layers of the first and second tubes being unitary and joining the first and second tubes along a seam; the seam being split starting at a location spaced from the ends of the tubes to separate the first and second end portions from one another, wherein the first and second end portions are adapted to connect via couplings threadably attached to the spring nuts to the laterally spaced input and output fittings on the supply lines and by the first and second glad hand connectors to the laterally spaced glad hand connectors on the emergency air brake lines; and a reinforcing member at the location of the split to prevent further splitting of the seam.

2. The air brake hose of claim 1, wherein the free end portions are of different lengths for one tube with respect to the other tube.

3. The air brake hose of claim 1, wherein the free end portions are the same length.

4. The air brake hose of claim 1, wherein the reinforcing member is a vinyl band constricted around the hose.

5. The air brake hose of claim 1, wherein the reinforcing ring is a meal band constricted around the hose.

* * * * *